US011531654B1

(12) United States Patent
Crenwelge et al.

(10) Patent No.: US 11,531,654 B1
(45) Date of Patent: Dec. 20, 2022

(54) SOURCE TO TARGET AUTOMATED COMPARISON

(71) Applicant: United Services Automobile Association (USAA), San Antonio, TX (US)

(72) Inventors: Ryan Christopher Crenwelge, Live Oak, TX (US); Hima Bindu Naga Dadireddy, San Antonio, TX (US); Narendra Reddy Korisapati, San Antonio, TX (US); Margaret A. Lynch, La Vernia, TX (US); Kerry Zeng, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 137 days.

(21) Appl. No.: 16/915,535

(22) Filed: Jun. 29, 2020

(51) Int. Cl.
*G06F 16/215* (2019.01)
*G06F 40/205* (2020.01)
*G06F 9/445* (2018.01)
*G06F 11/36* (2006.01)

(52) U.S. Cl.
CPC ........ *G06F 16/215* (2019.01); *G06F 9/44505* (2013.01); *G06F 11/3688* (2013.01); *G06F 40/205* (2020.01)

(58) Field of Classification Search
CPC .. G06F 16/215; G06F 40/205; G06F 9/44505; G06F 11/3688; G06F 16/214
USPC ........................................................ 707/694
See application file for complete search history.

(56) References Cited

U.S. PATENT DOCUMENTS

| | | | |
|---|---|---|---|
| 9,454,526 B1* | 9/2016 | Kapoor | G06F 21/00 |
| 2004/0002958 A1* | 1/2004 | Seshadri | H04L 12/1859 |
| 2005/0138606 A1* | 6/2005 | Basu | G06F 8/30 |
| | | | 717/136 |
| 2005/0256892 A1* | 11/2005 | Harken | G06Q 10/10 |
| 2012/0265726 A1* | 10/2012 | Padmanabhan | G06F 16/214 |
| | | | 707/602 |
| 2014/0282433 A1* | 9/2014 | Eilam | G06F 11/3612 |
| | | | 717/124 |
| 2015/0019488 A1* | 1/2015 | Higginson | G06F 16/214 |
| | | | 707/634 |
| 2015/0142738 A1* | 5/2015 | Fujii | G06F 16/273 |
| | | | 707/613 |
| 2019/0296997 A1* | 9/2019 | Menon | H04L 41/5009 |
| 2020/0394164 A1* | 12/2020 | Apte | G06F 16/2282 |

OTHER PUBLICATIONS

Schelter, Sebastian et al. Proceedings of the VLDB Endowment, vol. 11, No. 12, published in 2018.*

* cited by examiner

*Primary Examiner* — Belix M Ortiz Ditren
*Assistant Examiner* — Abdullah A Daud
(74) *Attorney, Agent, or Firm* — Fletcher Yoder, P.C.

(57) ABSTRACT

The present disclosure relates to methods and systems for providing validation of transformed electronic data. A source to target comparison service identifies testing configuration parameters and performs a comparison between source and target electronic data to identify anomalies for each transformed data item in the target automated comparison.

20 Claims, 6 Drawing Sheets

SOURCE TO TARGET AUTOMATED COMPARISON

BACKGROUND

The present disclosure relates generally to systems and methods to facilitate validation of transformed data. More specifically, the current disclosure relates to systems and techniques for providing efficient and automatic analysis of data to identify potential erroneous electronic transfer/transformations of the data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Computer networks provide a connected world of electronic devices and/or services, where an increasing number of activities can be performed via network communication. As computer services become increasing utilized and complex, these services may rely on a significant amount of electronic data. Further, these systems oftentimes maintain private and/or sensitive information that should have limited access.

Sometimes system migrations, upgrades, and/or other scenarios arise where data is transferred/transformed from a source data store to a target data store in an Extract, Transform, and Load (ETL) process. Unfortunately, as the complexity and amount of data stored by computer systems increases, data transfers/transformations performed on the electronic data (e.g., moving the data from one set of electronic fields in a first data store to a second set of disparate fields in a second data store) becomes more complex. When the transfers/transformations are performed incorrectly, this may result in exposing private and/or sensitive data to unintended recipients. Finding defects in data is difficult when migrating a significant number (e.g., over one million) of records. Typically, data transfers/transformations have been validated by analyzing a sample set of data for inconsistencies and/or errors. However, this may be insufficient, as electronic data transfers/transformations may introduce errors in particular records outside of the sample set, while not introducing errors within the sample set. Accordingly, new techniques are provided herein to efficiently and effectively automate validation of all records of an electronic data transfers/transformation.

SUMMARY OF THE INVENTION

Embodiments of this disclosure include systems and methods for effectively and efficiently implementing full-record validation of transformed electronic data sets. In particular, the current techniques (e.g., the Source to Target Automated Comparison (STAC) validation) relate to techniques for comparing each record of a transferred/transformed electronic data set against validation rules and/or source data to pinpoint errors within any record of the transformed data. The STAC validation can be integrated in a Continuous Integration Continuous Delivery (CI/CD) integration process to give developers immediate feedback regarding their data transfers/transformations. The STAC validation can perform a full data validation by comparing data cell by cell, generating reports indicating exact data mismatches. Further, the STAC validation tests may be performed in an automated manner, reducing manual testing efforts, by automatically performing without user interaction upon receiving a test start trigger. A STAC validation history may be maintained, storing a history of when STAC validation tests were run and what the STAC validation test results were. This information may be stored in a graphical user interface (GUI) (e.g., a dashboard) for quick indication to developers and others of STAC validation test results. Further, test cases may be version controlled, enabling developers a way to rollback their test cases along with their code. Through granular properties files, the STAC validation tests may be executed in a multitude of environments, allowing testers to write test cases once and cover each of these environments. As will be described in more detail below, the STAC validation tests may use, in some embodiments, a single data source, for validation of data quality of the single data source, using business validation rules. For example, null checks (e.g., identifying data cells having a null value that should not), domain value checks (e.g., identifying data cells having values outside a domain of available options), special character checks (e.g., identifying data cells that include special characters that should or should not be present), along with many other checks may be performed via the STAC validation tests.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure are described above. In an effort to provide a concise description of these embodiments, certain features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

While only certain features of the disclosure have been illustrated and described herein, many modifications and changes will occur to those skilled in the art. For example, while the embodiments described herein include a specific logic organization for private information protection services, substantially similar benefits provided by the present invention may be obtained by trivial structural alterations such as changes in name or in non-substantial changes to the mode of operation of the data structures. It is, thus, to be understood that the appended claims are intended to cover all such modifications and changes as fall within the true spirit of the invention.

Figure 1:
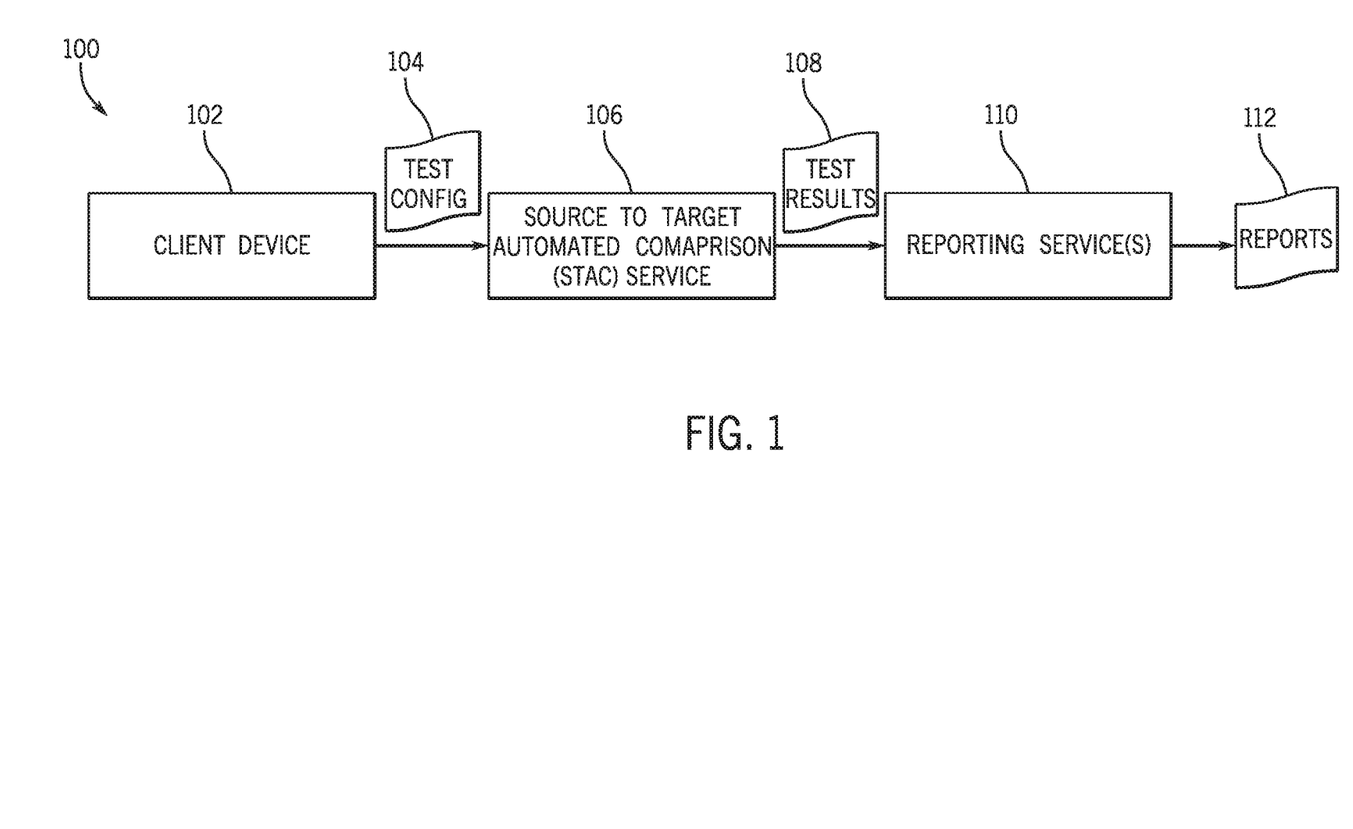
FIG. 1 is a schematic diagram, illustrating a system for providing data transfer/transformation validation, in accordance with embodiments of the present disclosure.

Turning first to a discussion of an overall system for providing validation of transformed electronic data, FIG. 1 is a schematic diagram, illustrating a system 100 for providing data transfer/transformation data validation, in accordance with embodiments of the present disclosure. As illustrated, the system 100 includes a client device 102. The client device 102 may be an electronic device, such as a computer, tablet computer, server, etc. that initiates a source to target automated comparison (STAC) test to verify that target data is in an expected format and includes expected data.

To trigger the STAC test, the client device 102 causes test configuration files 104 to be provided to the STAC service 106. The test configuration files 104 may, in some embodiments, include a Test Case Properties File that contains data related to the test case, including queries, data sources, target data stores to verify, comparison parameters, etc. The Test Case Properties may be customizable with a variety of editable parameters. Table 1 below provides a non-exhaustive list of possible source parameters and their description.

TABLE 1

Test Case Property File Parameters

| Source | Description |
| --- | --- |
| Source_Alias | The Security Alias for the Database Credentials you're trying to connect to. If you don't have a Security Alias set up, then you can put the username in the Database Connections properties file with the prefix <Source_Credentials>_Username and <Source_Credentials>_Password. |
| Source_AppID | Application ID associated with a security entity (e.g., CyberArk) service account, only applicable if using a security entity (e.g., CyberArk) |
| Source_Environment | The prefix for the Database Connection details in the Database Connections properties file. You have to prefix each of the database connection files with the Source Environment. For example, in the Database Connections file, you can have <Source_Environment>_HostName. |
| Source_Type | The database type of the Source. In some embodiments, the options may be: fixed-width, CSV (comma-separated values) or file, oracle, Essbase, hive, db2, and/or Netezza. |
| Source_Additional_Files | The additional source files you want to add for the source. All source files should have the same format as the original. |
| Source_Query | The query you want to run to retrieve the data. This can be empty if you have a CSV or a fixed width file. |

| Target | Purpose |
| --- | --- |
| Target_Alias | Same as the source but for the target. |
| Target_AppID | Application ID associated with a security entity (e.g., CyberArk) service account, only applicable if using a security entity (e.g., CyberArk). |
| Target_Environment | Same as the source but for the target. |
| Target_Type | Same as the source but for the target. |
| Targe_Additional_Files | Same as the source but for the target. |
| Target_Query | Same as the source but for the target. |
| Comparison | |

| Parameters | Purpose |
| --- | --- |
| Keys | The Key columns in the Source that you want to use to uniquely identify each column. All of the columns in the Target that are in the same position will also become the Key. |
| Values | The Value columns in the Source that you want to use to compare cell by cell. |
| Unimportant_Fields | The unimportant columns in the Source that you want to ignore. The columns in the same position in the Target will also be ignored. |
| Check_Sum_Field | The field in the Source you want to sum up on. |
| Null_Value_Field | The field in the Source you want to check for Null values. |
| Precision_Value_Columns | The column you want to set the precision, the number of zeros before/after the decimal, for separated by commas. E.g., ColumnA{3}, ColumnB{-1} |
| Threshold_Value_Mismatch | The column you want to set the threshold for, the number of zeros before/after the decimal, for separated by commas. E.g., ColumnA {.00001}, ColumnB{1} |
| Rough_Target_Transformation | This will transform all of the Target Keys back into the Source Keys when doing Essbase Comparisons. This may be set to False by default. |
| Merge_Values | This will aggregate all the rows with the same Key combination and sum those rows up to create 1 row. This may be set to False by default. |

TABLE 1-continued

Test Case Property File Parameters

| Report Parameters | Purpose |
|---|---|
| Max_Character _Output | The maximum number of characters you want to output for the Source Table CSV's, Target Table CSV's, Source Duplicates, and Target Duplicates. |
| Mismatches_Max_ Character_Output | The maximum number of characters you want to output for the Key Mismatches and Value Mismatches. |

| Test Case Management Suite Parameters | Purpose |
|---|---|
| Test_Case_Names | The names of the Test Cases that you want to update in the Automated Test Case Managemen Suite. |

The test configuration files 104 may, in some embodiments, include a Global/Reporting Properties File that contains the parameters for reporting results (e.g., email notification parameters, Test Case Manager Result end point parameters, etc.). As may be appreciated, the Global/Reporting Properties File may be a configuration file that applies globally to a set of distinct test cases, enabling ease of input of these parameters once for the set of distinct test cases. Table 2 illustrates a non-exhaustive list of possible parameters of the Global/Reporting Properties file.

TABLE 2

Parameters of the Global/Reporting Properties File

| Parameter | Description |
|---|---|
| To_Email | The Email Destinations you want to send results reports to (e.g., separated by semicolons). |
| From_Email | The Email Source you want to send the results reports from. |
| Subject | The subject of the email you want to include the results reports email that is sent. |
| Test_URL | The Test Case Manager Gateway URL where the framework will send the results to. |
| Test_Token | The token of the Test Case Manager user. In some embodiments, the default may be a corporate user token, which may be replaced with an individual user's token (e.g., when specialized access requiring the individual is needed). |
| Test_ID | The Test Case Manager Project ID may be provided using this parameter. |

The test configuration files 104 may, in some embodiments, include a Data Connections Properties File that contains database connection details for databased that will be connected to. Table 3 illustrates a non-exhaustive list of parameters that may be provided in the Data Connections Properties File.

TABLE 3

Parameters of the Data Connections Properties File

| Parameter | Description |
|---|---|
| Service_Provider | The service provider for the Essbase Cube. |
| Server_Name | The analytics server name of the Essbase Cube. |
| APP_Name | The app name of the Essbase Cube. |
| Cube_Name | The Cube name of the Essbase Cube. |

Additionally, Tables 4-Y illustrate connection string templates for connecting to particular types of data stores. Table 4 illustrates Thin Client Connection String Parameters. The Thin Client Connection String is template as: "jdbc:oracle: thin:@"+<HostName>+":"+<Port>+":"+<SID>.

TABLE 4

Thin Client Connection String Parameters

| Parameter | Description |
|---|---|
| HostName | The Host Name of the oracle database |
| Port | The port of the of the oracle database |
| SID | The System ID of the oracle database |

Table 5 illustrates Lightweight Directory Access Protocol (LDAP) Connection String Parameters. The LDAP Connection String is templated as: "jdbc:oracle:thin:@ldap://oidg-prod:"+<LdapServer>+"/"+<DBService>+","+"cn=Oracle-Context,dc=world".

TABLE 5

LDAP Connection String Parameters

| Parameter | Description |
|---|---|
| LdapServer | The LDAP server for Oracle Databases |
| DBService | The DB you want to connect to |

Table 6 illustrates DB2 Connection String Parameters. The DB2 Connection String is templated as: jdbc:db2:"+ "//"+<HostName>+":"+<Port>+"/"+<DB>.

TABLE 6

DB2 Connection Parameters

| Parameter | Description |
|---|---|
| HostName | The Hostname for the DB2 Database. |
| Port | The Port for the DB2 Database |
| DB | The DB of the DB2 Database. |

Table 7 illustrates DB2 with Secure Sockets Layer (SSL) Connection String Parameters. The DB2 Connection String with SSL is templated as: "jdbc:db2:"+"//"+<HostName>+ ":"+<Port>+"/"+<DB>+":"+"sslConnection="+<SSL>.

TABLE 7

DB2 with SSL Connection Parameters

| Parameter | Description |
|---|---|
| Hostname | The HostName of the DB2 Database. |
| Port | The Port for the DB2 Database |

TABLE 7-continued

DB2 with SSL Connection Parameters

| Parameter | Description |
| --- | --- |
| DB | The DB of the DB2 Database. |
| SSL | The SSL of the DB2 Database. |

Table 8 illustrates Netezza with Port Connection String Parameters. The Netezza with Port Connection String is templated as: "jdbc:netezza:"+"//"+<HostName>+":"+<Port>+"/"+<SID>.

TABLE 8

Netezza with Port Connection String Parameters

| Parameter | Description |
| --- | --- |
| HostName | The host name of the Netezza Database |
| Port | The port for the Netezza Database |
| SD | The System ID of the Netezza Database. |

Table 9 illustrates Netezza without Port Connection String Parameters. The Netezza without Port Connection String is templated as: "jdbc:netezza:"+"//"+<HostName>+"/"+<SID>.

TABLE 9

Netezza without Port Connection String Parameters

| Parameter | Description |
| --- | --- |
| HostName | The host name of the Netezza Database |
| SID | The System ID of the Netezza Database |

Certain other parameters may also be set in the Data Connections Property File. For example, Table 10 provides an un-exhausted list of possible parameters that may be set in this file.

TABLE 10

Data Connections Property File Parameters

| Parameter | Description |
| --- | --- |
| HostName | The host name of the Hive Database. |
| Port | The port number of the Hive Database. |
| DB | Hive database name. |
| SSL | SSL True or False |
| TransportMode | Set value as "HTTP" |
| HttpPath | Set values as "gateway/default/hive" |

The STAC service 106 is a services that executed a data validation check by running data queries and comparing the results of these data queries with business validation rules and/or other data queries to identify whether there is any mis-transformed data in a target data set. Examples of particular use cases of the STAC service 106 may include regression testing, such as when there is a version upgrade, as these tests are independent of the system that the STAC service 106 is testing. For example, if a PeopleSoft or DataStage upgrade occurs, the STAC service 106 may validate that the upgrade did not result in any improper data transfers/transformations (e.g., deletion of data, improper moving of data, additions to data, etc.). Table 11 illustrates a variety of data quality checks that may be invoked by the business validation rules (e.g., via parameters in the test configuration files 104).

TABLE 11

Data Quality Checks

| Criteria Name | Description |
| --- | --- |
| columnRangeBetween | Validates whether the column specified has the Range value between X and Y. (E.g.: X = 10 and Y = 100) |
| columnRangeMin | Validates whether the column specified has the Minimum Range (E.g.: X=10) |
| columnRangeMax | Validates whether the column specified has the Maximum Range (E.g.: X =100) |
| columnContainsListOfNumericValues | Validates whether the column specified has list of numeric values |
| columnContainsLeftAndRightWhiteSpace | Validates whether the column specified has space before and after column(E.g.: TAX-TX) |
| getColumnSum | Get the column sum of the column provided |
| columnDuplicates | Validates whether the column specified has the any duplicates |
| columnFitRegex | Column value is validated using Regular Expression |
| columnContainString | Validates whether the column specified contains any string value |
| recordsContainNoDuplicates | Validates whether the record contains no duplicate value |
| columnContainsNoNulls | Validates whether the column specified has no null value |
| columnContainsListsOfStringfValue | Validates whether the column specified has list of string value that has been provided |
| columnContainsLeftWhiteSpace | Validates whether the column specified has space in left (E.g.: TAX-TX) |
| columnContainsRightWhiteSpace | Validates whether the column specified has space in left (E.g. TAX-TX) |

Further, the STAC service 106 may be used for unit testing. Indeed, the STAC service 106 enables developers to have an efficient mechanism to validate if their data transfers/transformation jobs have run successfully, as the STAC service 106 quickly pinpoints mismatches in data, useful in root cause analysis of errors.

The STAC service 106 can be used for Straight Load Testing. For example, when a data transfer/transformation job is a straight load (e.g., copying data from source to destination in the same format (e.g., column order, etc.), the STAC service 106 enables quick validation of the columns of the source and the target to validate that all rows of data were transferred to the target.

The STAC service 106 can be used for Payload Transformation Testing. For example, by incorporating payload data transformations in the STAC service 106 queries, the STAC service 106 may validation payload data transformations in the target datastores.

The STAC service 106 can support multiple data source types. For example the source and/or target data sources may be databases, such as Oracle, Netezza, Hive, DB2, and/or Salesforce databases. Further, data files, such as comma-separated value (CSV) files, generic data (DAT) files, text (TXT) files, and fixed-width DAT files may be used as the source and/or target data sources. Further, the source and/or target data sources may be multi-dimensional data stores, such as Hyperion Essbase Cubes. As may be appreciated, the source data store types need not be the same as the target data store types, as the source data sets and target data sets are converted into universal data structures that can be compared against one another. Thus, the source data store may be a CSV file, while the target data store may be an Oracle database, for example.

To support a multitude of types of source and/or target data, the STAC service 106 may perform a data query specific to the particular type of source and/or target data type to parse and extract pertinent information for verification. The extracted pertinent information is stored in universal data structures of the STAC service 106, that enables a universal storage format for source and/or target data regardless of data source types. As will be discussed in more detail below, data from the source data source may be compared with the target data source to identify any erroneous data transfer from the source to the destination.

Table 12 illustrates some features of the STAC service 106 that may be used for data validation. These features may be implemented by setting parameters in the corresponding test configuration files 104.

TABLE 12

STAC Features Invokable via Parameters of the Configuration Files 104

| STAC Validation | Description |
| --- | --- |
| Source to Target-Row Count Comparison | Retrieve Row counts from Source and Target tables and compares. This feature reports the counts and any mismatches. |
| Source to Target - Column Count Comparison | Retrieve Column counts from Source and Target tables and compares these counts. This feature reports the counts and any mismatches. |
| Source to Target - Key Column Comparison | Checks if the user defined Key Combination from the Source is in the Target and reports the Key Mismatches. |
| Source to Target- Value Column Comparison | The STAC service does a cell by cell comparison of all the value columns for the matching Key Combinations between Source and Target and reports the Value Mismatches |
| Target to Source- Key Column Comparison | Checks if the user defined Key Combination from the Target is in the source and reports the Key Mismatches. |
| Target to Source- Value Column Comparison | The framework does a cell by cell comparison of all the value columns for the matching Key Combinations from Target to Source and reports the Value Mismatches |
| Source to Target- Column Key Duplicate Record Check | Check if there are any duplicate records, records with the same key combination, in source or target and report any duplicates that are found |
| Set Unimportant Columns for comparison | Columns that should not be considered when comparing. Ex: Randomly generated IDs, timestamps, or Run Dates. |
| Source to Target- Column(s) sum comparison | Compares the sum of a given column between source and target and reports the sum of the column. |
| Null Value check for any given | Checks for Null values for given Column in the Test case property file. |
| Precision ( Set # of decimals for comparison) | Allows the user to define the number of decimal points to be used in a comparison for a given column between source and target. E.g., Precision Value Columns = MONTH_END_UPB(1). |
| Threshold check (Accepted difference) | Compares the absolute value of the difference between source and target column and compares it to the threshold value, if the absolute value is less than or equal to the threshold it will pass. Threshold is defaulted to 0, but can be defined by the user. E.g., $\|10.008 - 10.007\| = 0.001 <= 0.001$(threshold value) = pass. |
| Multiple Source/ Target Files for CSV/ Fixed width files | Allows for multiple Sources or Targets files to be concatenated into one data set for comparison. E.g., One source to many targets, many sources to one target or many sources to many targets. |
| Running Queries on CSV's (CSVDB) | This will allow users to run tests on their CSV's without modifying the CSV's (e.g., using a Substring or other query function to query a CSV). |
| Check Column(s) values are within given Range | Validates whether the column specified has the Range value between X and Y (e.g., X = 10 and Y = 100). |
| Check Column(s) Contains list of Domain values | Validates whether the column specified has values within a list of numeric values. |
| Set Single/multiple columns to check for duplicates | Allows user to set Single or multiple columns as key and check for duplicates in dataset. |
| Check for null or any given special characters in a column(s) | Allows user to set any special character and search for occurrence in given column. |
| Update Test Run Status in Test Case Management Suite | Automation framework has the capability to report individual status of automated test cases for the below validations. The test suite id for the test may be provided. |
| Redirect output path | Allows user to redirect output path to any given location. |
| Set Attachment Flag to True/False | Allows user to set Attachment flag to True/False to receive the report in an attachment of an output email. |
| LDAP Connection | The framework is able to connect to databases via LDAP connection without providing host names. |

TABLE 12-continued

STAC Features Invokable via Parameters of the Configuration Files 104

| | |
|---|---|
| Email Report | Automation Framework has capability to email users with each validation with status and also overall status. Validation Results may include: Row Count, Column Count, Duplicates, Check |
| Email Report | Automation Framework has capability to email User with each validation with status and also overall status Validation Results consists Row Count Column Count Duplicates Check Sum Null Value Check Key Mismatches Value Mismatches |
| Security Alias/ CyberArk | The user can specify a Security Entity (eg , CyberArk) alias for the database and the Framework will retrieve the credentials and use them. |

| Feature | Purpose |
|---|---|
| Running Tests from Easy to Re-Run Old Test Cases | Once the user creates the test case files, they are able to use Users can go to their pipelines page in the lifecycle tool and look back at previous tests they've run and re-run for regression purposes or when troubleshooting |
| Version Control for Test Cases | Users can maintain a history of their test cases and see exactly when their test cases broke and what they changed to fix it. |
| Shared Test Cases for Entire Team | This empowers the entire team to do testing by giving the team a common place to put their test cases and allows anyone to create or run them |
| Branches for Different Projects | Teams can separate branches for separate projects |
| Automatically Updates Test Cases in Test Case Management Suite (e.g., qTest) | This speeds up testing by automatically updating all of the tests in a test suite, saving testers time, instead of having to manually enter the test results in. |
| Test Case Ownership | A history of who created the tests and who ran them may be provided to the Test Case Management Suite. Thus, credit may be given to the testers performing the STAC validation tests. |

Test results 108 (e.g., an electronic data payload indicating whether there were errors detected in the data transfer/transformation) may be provided to reporting services 110. In some embodiments, the electronic data payload may comprise an electronic command that causes the reporting services 110 to provide reports 112 to downstream components. For example, an email providing an indication of the test results 108 may be transmitted to electronic devices that have subscribed to or otherwise indicated as interested in the test results 108.

Figure 2:
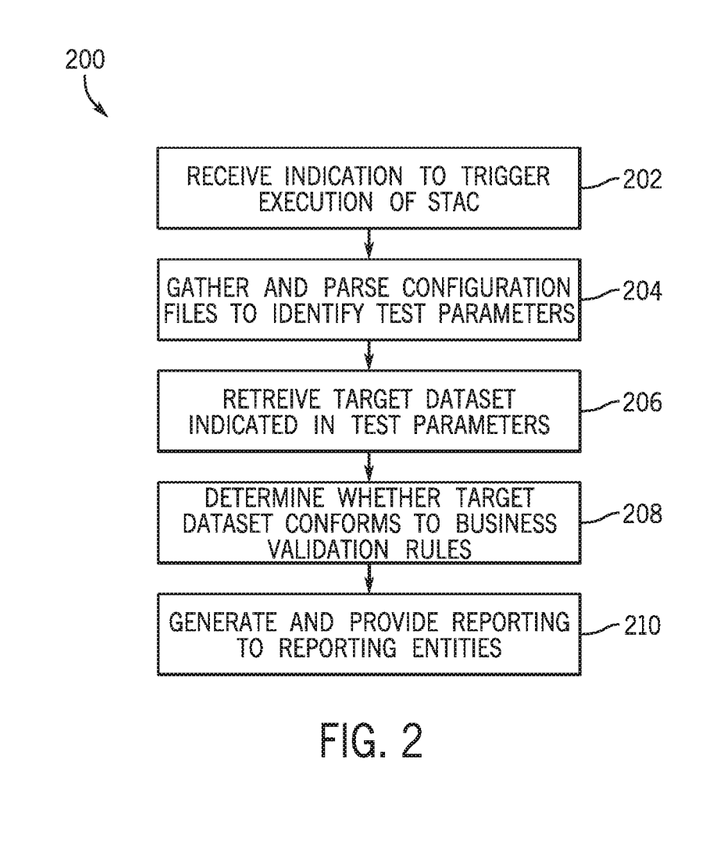
FIG. 2 is a flowchart, illustrating a process for performing transformed data validation using validation rules, in accordance with an embodiment of the present disclosure.
Figure 3:
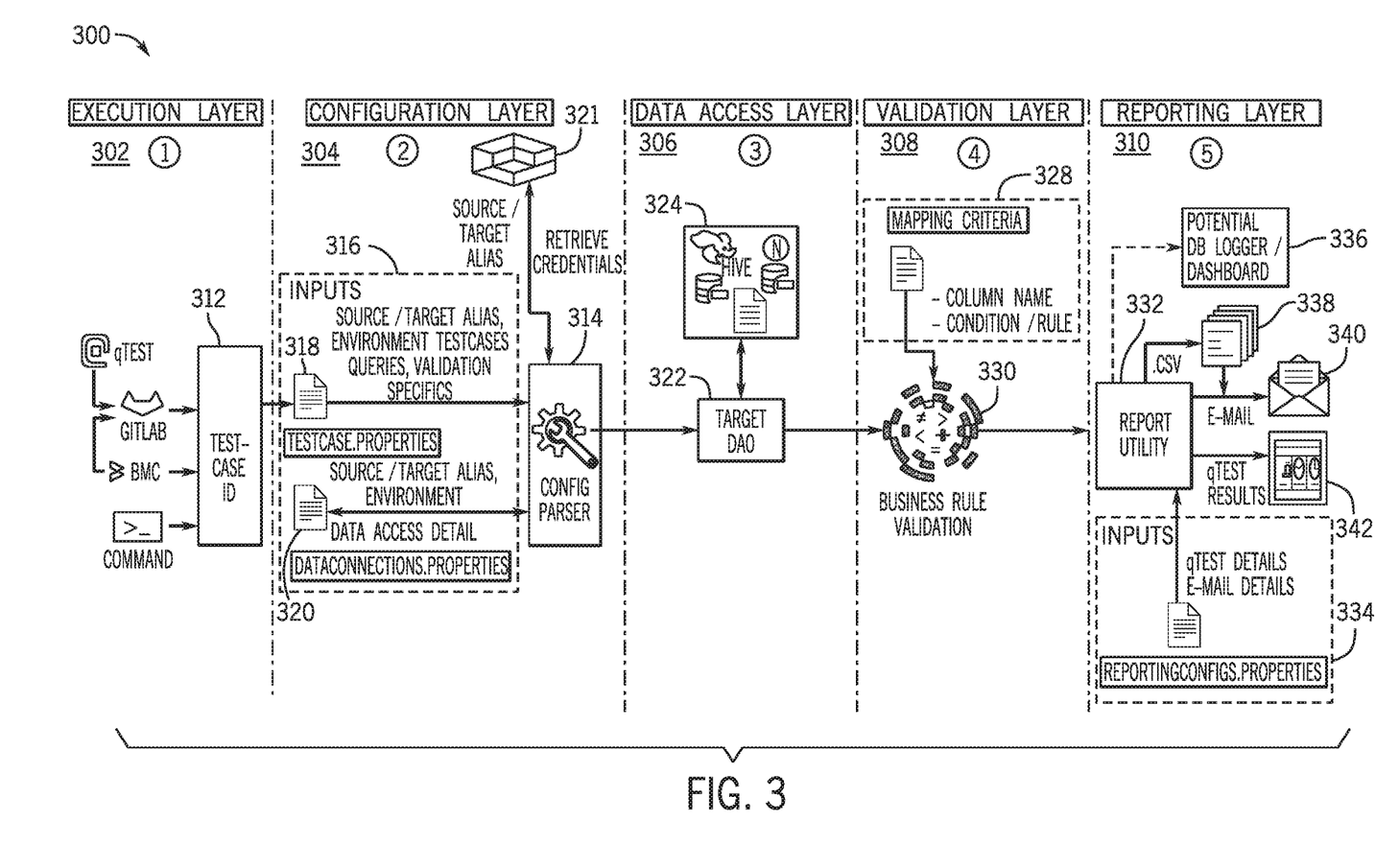
FIG. 3 is a system diagram, illustrating components for implementing the process of FIG. 2, in accordance with an embodiment of the present disclosure.

FIG. 2 is a flowchart, illustrating a process 200 for performing data transfer/transformation validation using validation rules, in accordance with an embodiment of the present disclosure. FIG. 3 is a system diagram, illustrating a system 300 for implementing the process of FIG. 2, in accordance with an embodiment of the present disclosure. Each of the layers of FIG. 3 (e.g., the execution layer 302, the configuration layer 304, the data access layer 306, the validation layer 308, and the reporting layer 310) correspond to particular blocks of the process of FIG. 2. For clarity, FIGS. 2 and 3 will be discussed together.

The process 200 begins with receiving an indication to trigger execution of the STAC service 106 (block 202). For example, as illustrated in the execution layer 302 of FIG. 3, the STAC service 106 may be triggered by an electronic command provided from a test case management tool, such as qTest, a lifecycle tool, such as GitLab, IT management platforms, such as those from BMC software, and/or via user commands provided via a command prompt (e.g., of the operating system). The electronic command may specify a Test Case Identifier 312, which enables downstream components to access the proper test properties to be executed.

For example, the process 204 includes gathering and parsing configuration files to identify test parameters (block 204). A configuration parser 314 may access inputs 316 to obtain parameters for the test.

For example, as mentioned above, multiple configuration files may exist. For example, a Test Case Properties File 318 may be specific to a particular test case and may provide properties associated with the specific test case. For example, these properties may include specific data queries for extraction of source and target datasets, comparison parameters, etc.

Further, a Data Connections Properties file 320 may provide connection details for source and target data sets. For example, connection strings for the source and/or target data stores may be provided in this file. In some instances, a security alias may be provided in the Test Case Properties File 318, which may be provided from the Configuration Parser 314 to a security platform 321, such as that produced by CyberArk. In response, the security platform 321 may provide credentials for the target data source, which are retrieved by the configuration parser 314.

Once the configuration parser 314 has the test case parameters parsed, the process 200 continues by retrieving a target dataset indicated in the test parameters (block 206). As mentioned above the target dataset may be stored in a database, a data file, a multidimensional data store, or any other type of datastore. Parsing rules for the particular type of target dataset may be used to parse the dataset and extract the target dataset into a STAC service 106 specific data structure, enabling quick access to the target dataset for data validation and comparison purposes. Further, the test parameters may provide a particular query to perform to obtain a subset of data from the target data source. The query results may be inserted into the universal data structure. Thus, despite disparate data store types, each data set may be processed in a common manner, by using the universal data structure of the STAC service 106. In FIG. 3, a target data access object (DAO) is used to retrieve the target dataset from the target data store 324. In this manner specific data operations may be performed without exposing un-necessary details of the target data store.

As depicted and mentioned above, a multitude of data source types may be supported. For example, databases, such as Oracle, Netezza, Hive, DB2, and/or Salesforce databases may be supported, data files, such as comma-separated value (CSV) files, generic data (DAT) files, text (TXT) files, and fixed-width DAT files may be supported, and multi-dimensional data stores, such as Hyperion Essbase Cubes may be supported.

Next, prescribed business validation rules 330 are accessed and verified against the universal data structure holding the query result to determine whether the target dataset conforms to the business validation rules (block 208). For example, the business validation rules may require certain combinations of data or other criteria be present in the universal data structure, as indicated by mapping criteria 328. The universal data structure holding the target dataset may be traversed to identify whether the required combinations exist. The mapping criteria 328 may utilize data column names and/or conditions/rules associated with those data column names to define particular validation rules. This will be described in more detail below with regard to FIG. 6.

Once the target dataset is validated, the process 200 also includes generating and providing reporting to reporting entities (block 210) regarding an indication of whether the target dataset is validated or includes errors. For example, as mentioned above, a report utility 332 may access a Global/Reporting Properties File 334, which may provide certain properties that apply globally for reporting across all and/or a plurality of test cases. Parameters provided in this file may include report destinations, Test Case Management tokens that identify the group and/or user performing the test, etc. Based upon the properties found in this file 334, the report utility 332 may provide many different formats of reports. For example, validation results may be provided to a DB Logger and/or a graphical user interface dashboard 336. In some embodiments, a comma-separated value (CSV) file 338 indicating the validation results may be generated. In some embodiments, an email report 340 may be generated. Further, in some embodiments, Test Case Management reporting (e.g., qTest reporting) may occur by providing results back to the Test Case Management Platform 342.

Figure 4:
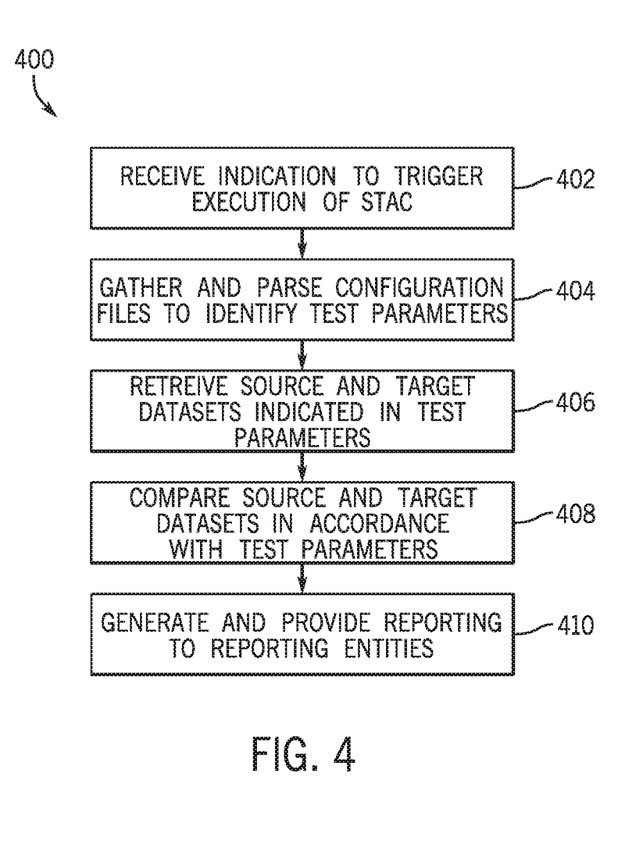
FIG. 4 is a flowchart, illustrating a process for performing transformed data validation by comparing source and target data, in accordance with an embodiment of the present disclosure.
Figure 5:
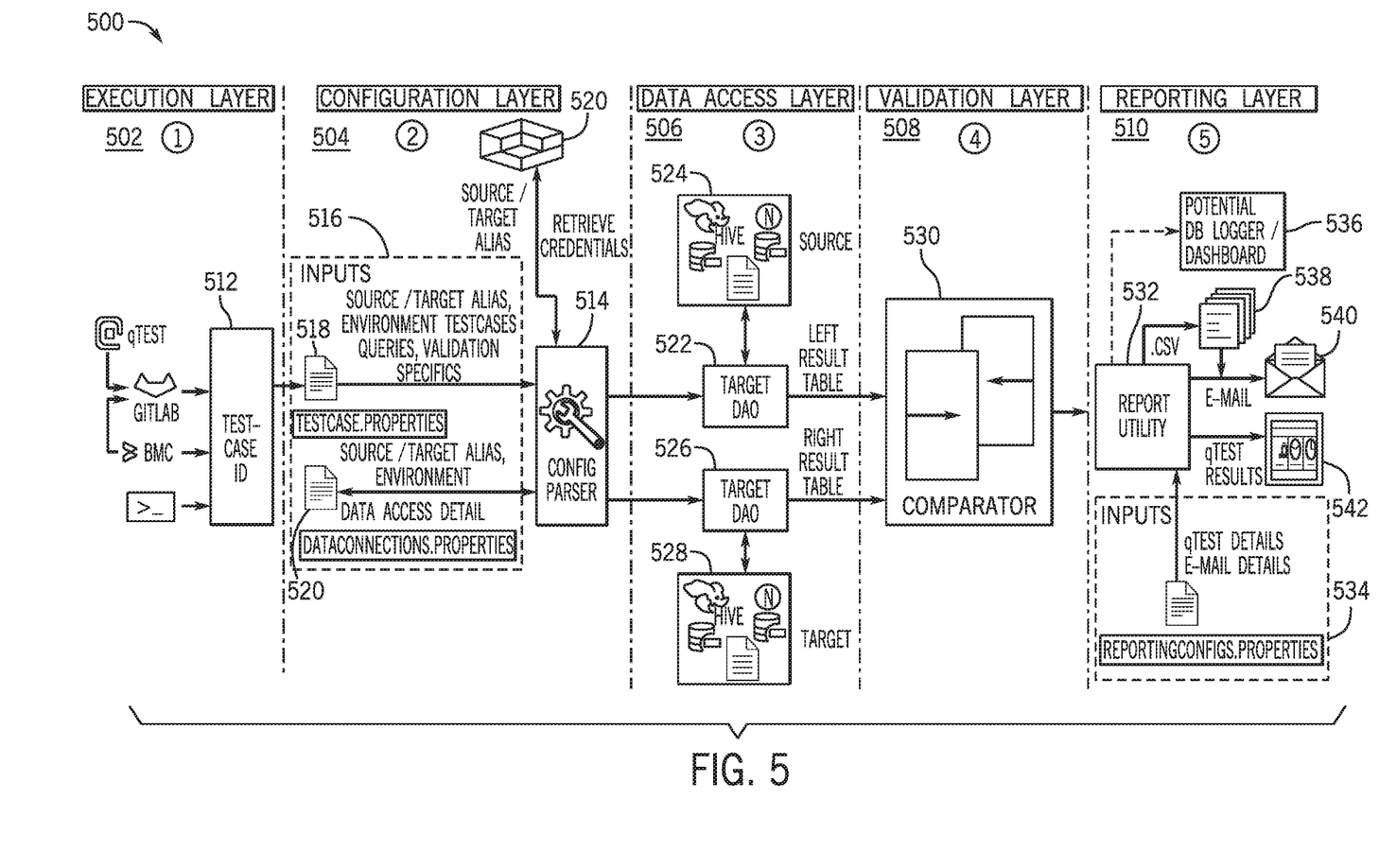
FIG. 5 is system diagram, illustrating components for implementing the process of FIG. 4, in accordance with an embodiment of the present disclosure.

Having discussed embodiments where the target datasets are compared to business validation rules, FIG. 4 is a flowchart, illustrating a process 400 for performing transformed data validation by comparing source and target data, in accordance with an embodiment of the present disclosure. FIG. 5 is system diagram, illustrating a system 500 for implementing the process of FIG. 4, in accordance with an embodiment of the present disclosure. Each of the layers of FIG. 5 (e.g., the execution layer 502, the configuration layer 504, the data access layer 506, the validation layer 508, and the service layer 510) correspond to particular blocks of the process of FIG. 2. For clarity, FIGS. 2 and 3 will be discussed together. For clarity, FIGS. 4 and 5 will be discussed together.

The process 400 begins with receiving an indication to trigger execution of the STAC service 106 (block 402). For example, as illustrated in the execution layer 502 of FIG. 5, the STAC service 106 may be triggered by an electronic command provided from a test case management tool, such as qTest, a lifecycle tool, such as GitLab, IT management platforms, such as those from BMC software, and/or via user commands provided via a command prompt (e.g., of the operating system). The electronic command may specify a Test Case Identifier 512, which enables downstream components to access the proper test properties to be executed.

For example, the process 404 includes gathering and parsing configuration files to identify test parameters (block 404). A configuration parser 514 may access inputs 516 to obtain parameters for the test.

For example, as mentioned above, multiple configuration files may exist. For example, a Test Case Properties File 518 may be specific to a particular test case and may provide properties associated with the specific test case. For example, these properties may include specific data queries for extraction of source and target datasets, comparison parameters, etc.

Further, a Data Connections Properties file 520 may provide connection details for source and target data sets. For example, connection strings for the source and/or target data stores may be provided in this file. In some instances, a security alias may be provided in the Test Case Properties File 518, which may be provided from the Configuration Parser 514 to a security platform 521, such as that produced by CyberArk. In response, the security platform 521 may provide credentials for the target data source, which are retrieved by the configuration parser 514.

Once the configuration parser 514 has the test case parameters parsed, the process 500 continues by retrieving a source and a target dataset indicated in the test parameters (block 406). As mentioned above the source and the target datasets may be stored in a database, a data file, a multidimensional data store, or any other type of datastore. Parsing rules for the particular type of target dataset may be used to parse the dataset and extract the target dataset into a STAC service 106 specific data structure, enabling quick access to the target dataset for data validation and comparison purposes. Further, the test parameters may provide a particular query to perform to obtain a subset of data from the target data source. The query results may be inserted into the universal data structure. Thus, despite disparate data store types, each data set may be processed in a common manner, by using the universal data structures of the STAC service 106. In FIG. 5, a target data access object (DAO) 526 is used to retrieve the target dataset from the target data store 524 and a source DAO 522 is used to retrieve the source dataset from the source data store 528. In this manner specific data operations may be performed without exposing un-necessary details of the target and source data stores.

As depicted and mentioned above, a multitude of data source types may be supported. For example, databases, such as Oracle, Netezza, Hive, DB2, and/or Salesforce databases may be supported, data files, such as comma-separated value (CSV) files, generic data (DAT) files, text (TXT) files, and fixed-width DAT files may be supported, and multi-dimensional data stores, such as Hyperion Essbase Cubes may be supported.

Next, a comparator module 530 compares the source dataset against the target dataset in accordance with the testing parameters parsed by the configuration parser 514 (block 408). For example, as will be described in more detail below, specific keys and/or value indicators may be used to identify particular points of interest between the source datasets and the target datasets. Key and/or value matching may be performed by the comparator 530 to identify any pertinent mismatches. The key indication allows the STAC service 106 to quickly look up a value from the source dataset and the target dataset and the value indication allows us to compare values associated with the value indication. As mentioned above, in some instances, the test parameters may provide an indication of unimportant data and/or fields, where mismatches can be ignored. For example, timestamp fields may provide an indication of when a record was inserted into a data store, but these may not match between source and target, as the data was likely not entered at the same time in the source and in the target. Thus, by specifying that the timestamp field is unimportant, mismatches in this field will not result in invalidating the target dataset. The universal data structure holding the target dataset may be traversed in parallel with the universal data structure holding the source dataset to identify whether the required matches exist. This will be described in more detail below with regard to FIG. 6.

Once the target dataset is validated, the process 400 also includes generating and providing reporting to reporting entities (block 410) regarding an indication of whether the target dataset is validated or includes errors. For example, as mentioned above and illustrated in the service layer 510, a report utility 532 may access a Global/Reporting Properties File 534, which may provide certain properties that apply globally for reporting across all and/or a plurality of test cases. Parameters provided in this file may include report destinations, Test Case Management tokens that identify the group and/or user performing the test, etc. Based upon the properties found in this file 534, the report utility 532 may provide many different formats of reports. For example, validation results may be provided to a DB Logger and/or a graphical user interface dashboard 536. In some embodiments, a comma-separated value (CSV) file 538 indicating the validation results may be generated. In some embodiments, an email report 540 may be generated. Further, in some embodiments, Test Case Management reporting (e.g., qTest reporting) may occur by providing results back to the Test Case Management Platform 542.

Figure 6:
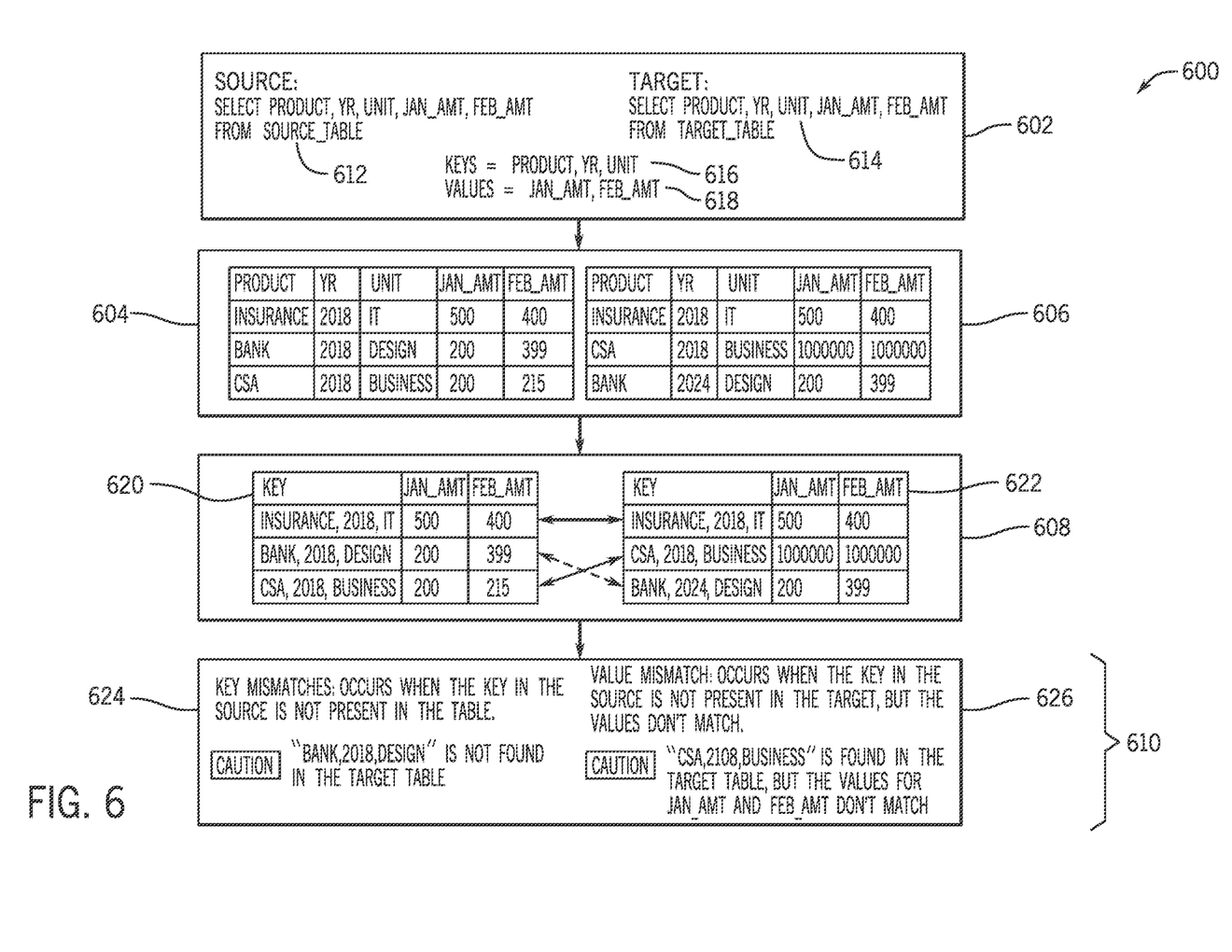
FIGS. 6 and 7 are schematic diagrams, illustrating example of validation data and validation results, in accordance with an embodiment of the present disclosure.
Figure 7:
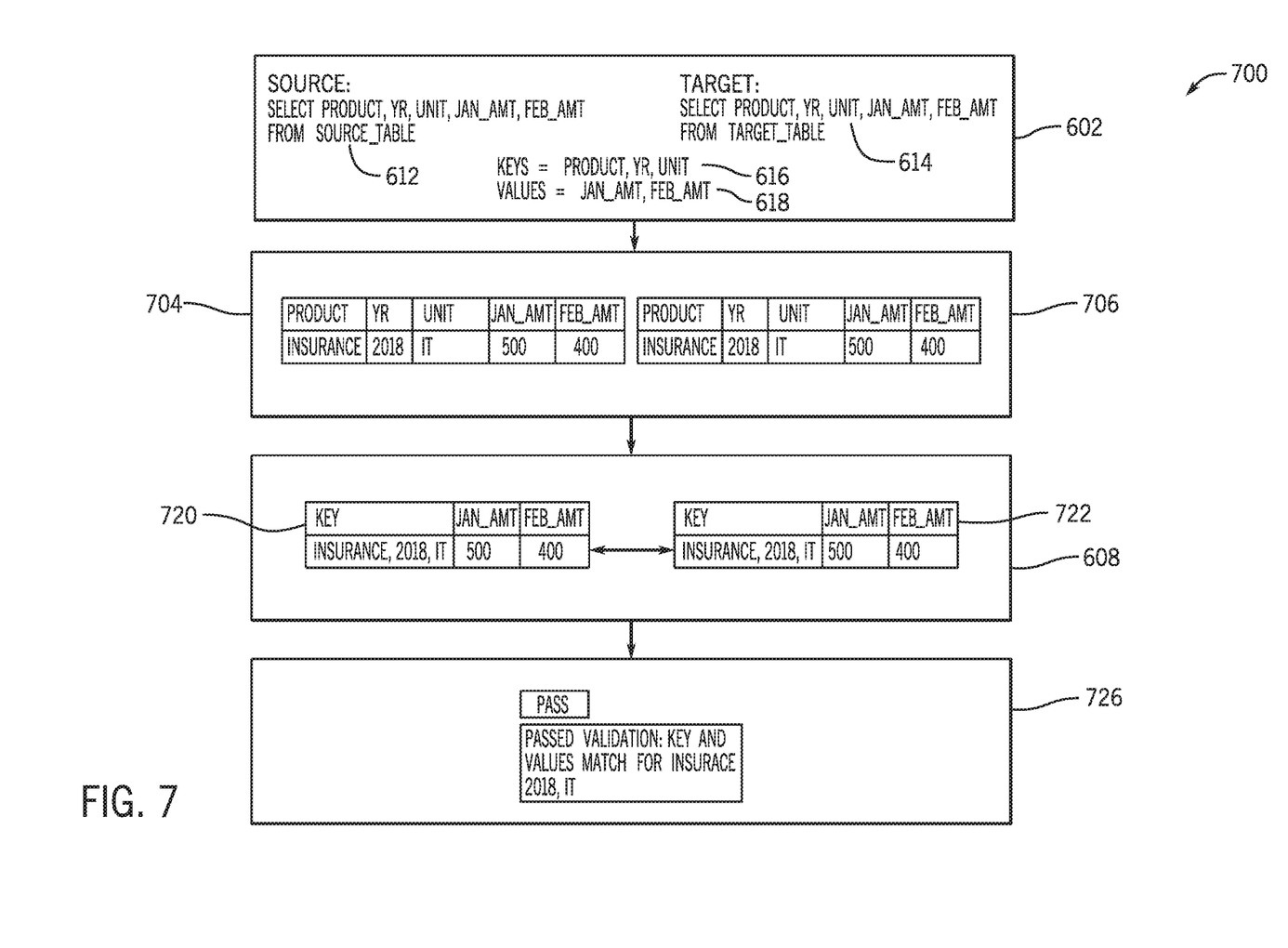

FIGS. 6 and 7 are schematic diagrams 600 and 700, illustrating examples of the validation process. FIG. 6 includes validation parameters 602, source dataset 604, target dataset 606, validation results 608, and reporting outputs 610, in accordance with an embodiment of the present disclosure. As illustrated, the validation parameters 602 may include a source query 612, a target query 614, keys 616, and/or values 618. The source query 612 provides an indication of the query to be executed on the source data store to obtain the source data set 604. As mentioned above, the keys 616 allow the STAC service 106 to quickly look up a value from the source dataset and the target dataset and the values 618 allow us to compare values associated with the value indication. For example, here, columns labelled "Product", "YR", "UNIT", "JAN_AMT", and "FEB_AMT" from "Source_Table" are pulled to create the source dataset 604. Further, the target query 614 provides an indication of the query to be executed on the target data store to obtain the target data set 606. For example, here, columns labelled "PRODUCT", "YR", "UNIT", "JAN_AMT", and "FEB_AMT" from "Source_Table" are pulled to create the target dataset 606.

Once the source dataset 604 and the target dataset 606 are obtained, the comparison/validation may be executed. Here, because keys 616 were specified, a source universal data structure 620 is generated that includes rows with a key column having each combination of "PRODUCT", "YR", and "UNIT" values found in the source dataset 604. Because values 618 were specified, the values from the source dataset 604 that are associated with the indicated values 618 are also added to the rows with the corresponding key combination values. The target universal data structure 622 is formed in a similar manner, but using the target dataset 606 rather than the source dataset 604.

Once the source universal data structure 620 and the target universal data structure 622 are generated, the comparison becomes very easy to complete. Since keys 616 were specified, a first validation of whether the key combinations found in the source universal data structure 620 match the key combinations found in the target universal data structure 622. For example, the key combination "Insurance, 2018, IT" is a key combination that is found in both data structures. However, "Bank, 2018, Design", which is in the source universal data structure 620, is not found in the Target universal data structure 622. Further, the "Bank, 2024, Design" key combination is found in the Target universal data structure 622, but is not found in the source universal data structure 620. Accordingly, there is not a match between the key combinations, which will result in a key mismatch reporting error 624. In the current embodiment, the key mismatch is set (e.g., via a configuration parameter) to only look for key combinations of the source dataset 604 that are not found in the target dataset 606. This may be useful when it is permissible to have additional records in target dataset. In other embodiments, an identical match may be specified, requiring identical key combinations in the source dataset 604 and target dataset 606. Under such a parameter, an additional key mismatch may be shown, indicating that "Bank, 2024, Design" is not found in the source dataset 604.

Because values 618 were specified, the comparison may continue by checking matches of the values associated with indicated values 618 for each of the key combinations. In the illustrated example, the key combination "CSA, 2018, Business" is found in both the source dataset 604 and the target dataset 606, as determined by querying the universal data structures 620 and 622. Accordingly, no key mismatch is triggered for this key combination. However, the source dataset 604 includes values 200 and 215 for JAN_AMT and FEB_AMT, respectively. In contrast, the target dataset 606 includes values 1000000 and 1000000 for JAN_AMT and FEB_AMT, respectively. Because these values do not match, a value mismatch reporting error 626 will be provided, indicating that these values do not match between the source dataset 604 and target dataset 606.

For illustration purposes, FIG. 7 illustrates a very similar test case, where the data provided in the source dataset 704 and the data provided in the target dataset 706 only include the first row of the source dataset 604 and target dataset 606 of FIG. 6, respectively. Because the source dataset 704 and target dataset 706 are different from those in FIG. 6, the source universal data structure 720 and target universal data structure 722 are also different than those in FIG. 6. Though the test parameters 602 are identical to those in FIG. 6, the reporting results 726 indicate that the target dataset 706 passes validation, as the problematic data of FIG. 6 has been removed.

The systems and techniques provided herein provide significant value in a world with increasing data-centric activity. Indeed, data records oftentimes reach into the millions of records making it virtually impossible for human validation, especially with the rapid dynamic changing nature of this data. By providing systems that can automatically validate massive amounts of data in a very efficient manner, using universal data structures, a robust system of data validation may ensure that sensitive data is incorrectly recorded and/or transmitted.

The invention claimed is:

1. A tangible, non-transitory, computer-readable medium comprising instructions that, when executed by one or more processors of a computer, cause the computer to:
   receive one or more test properties configuration files;
   extract one or more test properties from the one or more test properties configuration files, by parsing the one or more test properties configuration files, wherein the one or more test properties comprise: a source query, a target query, a key, and values;
   access a source data store identified in the one or more test properties;
   retrieve a source data set from the source data store based upon the source query;
   generate, from the source data set, a source universal data structure, comprising a source key value and associated source column data that is associated with the source key value, by:
      generating and inserting into a row of the source universal data structure the source key value by merging data that is in a common row of the source data set and is in columns of the source data set specified in the key; and
      inserting into the row of the source universal data structure, the associated source column data;
   access a target data store identified in the one or more test properties;
   retrieve a target data set from the target data store based upon the target query;
   generate, from the target data set, a target universal data structure, comprising a target key value and associated target column data that is associated with the target key value, by:
      generating and inserting into a row of the target universal data structure the target key value by merging data that is in a common row of the target data set and is in columns of the target data set specified in the key; and
      inserting into the row of the target universal data structure, the associated target column data;
   perform a validation test of all of the target data set in accordance with the one or more test properties, by comparing the row of the source universal data structure with the row of the target universal data structure to identify key mismatches, data mismatches associate with the key, or both; and
   transmit an electronic indication of results of the validation test to a reporting electronic device.

2. The computer-readable medium of claim 1, wherein the one or more test properties comprises an indication to compare the target data set with business validation rules to determine a data quality of the target data set.

3. The computer-readable medium of claim 2, wherein the business validation rules comprise an invocation of function by setting one or more parameters in the one or more test properties configuration files, the function comprising:
   a range validation pertaining to values in the target data set and a specified range;
   a value contains validation pertaining to the values in the target data set containing or not containing a particular specified content;
   a duplication validation pertaining to whether the target data set has duplicate content; or
   any combination thereof.

4. The computer-readable medium of claim 3, wherein the business validation rules comprise the range validation, the range validation comprising:
   a column range between validation that validates whether a specified column of the column range between validation has a range between two specified range values of the column range between validation;
   a column range minimum validation that validates whether a range of a specified column of the column range minimum validation has a specified minimum range of the column range minimum validation;
   a column range maximum validation that validates whether a range of a specified column of the column range maximum validation has a specified maximum range of the column range maximum validation; or
   any combination thereof.

5. The computer-readable medium of claim 3, wherein the business validation rules comprise the value contains validation, the value contains validation comprising:
   a contains whitespace validation that validates whether a specified column of the contains whitespace validation has values with whitespace, either before, after, or before and after the values;
   a numeric values validation that validates whether a specified column of the numeric values validation has values with a specified list of numeric values of the numeric values validation;
   a nulls validation that validates whether a specified column of the nulls validation has null values;
   a string values validation that validates whether a specified column of the string values validation has values with a specified list of string values of the string values validation;
   a contains string values validation that validates whether a specified column of the contains string values validation contains any string value; or
   any combination thereof.

6. The computer-readable medium of claim 3, wherein the business validation rules comprise the duplication validation, the duplication validation comprising:
   a column duplicates validation that validates whether a specified column of the column duplicates validation has any duplicate values;
   a records duplicates validation that validates whether records of the target data set include any duplicates; or
   both.

7. The computer-readable medium of claim 1, wherein the one or more test properties comprises an indication to compare the target data set with the source data set to determine a data nexus between the source data set and the target data set.

8. The computer-readable medium of claim 7, comprising instructions that, when executed by one or more processors of a computer, cause the computer to:
   based upon the indication to compare the target data set with the source data set:
      access the source data store identified in the one or more test properties;
      retrieve the source data set from the source data store; and
      perform the compare of all records of the target data set with all records of the source data set, in accordance with the one or more test properties.

9. The computer-readable medium of claim 1, wherein the source data store comprises a data store type different than a data store type of the target data store.

10. The computer-readable medium of claim 8, comprising instructions that, when executed by one or more processors of a computer, cause the computer to:

store the source data set in the source universal data structure;

store the target data set in the target universal data structure; and perform the compare using the source universal data structure and the target universal data structure.

11. The computer-readable medium of claim 1, wherein the one or more test properties comprise an invocation of function by setting one or more parameters in the one or more test properties configuration files, the function comprising:

a count validation pertaining to a count comparison between the source universal data structure and the target universal data structure;

a key validation pertaining to a key comparison between the source universal data structure and the target universal data structure;

a value validation pertaining to a value comparison between the source universal data structure and the target universal data structure; or any combination thereof.

12. The computer-readable medium of claim 1, comprising instructions that, when executed by one or more processors of a computer, cause the computer to:

identify, from the one or more test properties, a reporting method; and transmit the electronic indication of the results of the validation test to the reporting electronic device in accordance with the reporting method.

13. The computer-readable medium of claim 12, wherein the reporting method comprises:

publishing to a graphical user interface dashboard;

generating a comma-separated value (CSV) file;

transmitting an e-mail;

providing an electronic command to a Test Case Management suite; or any combination thereof.

14. A computer-implemented method, comprising:

receiving one or more test properties configuration files, comprising one or more test properties, comprising: a source query, a target query, a key, and values;

accessing a source data store identified in the one or more test properties;

retrieving a source data set from the source data store based upon the source query;

generating, from the source data set, a source universal data structure, comprising a source key value and associated source column data that is associated with the source key value, by:

generating and inserting into a row of the source universal data structure the source key value by merging data that is in a common row of the source data set and is in columns of the source data set specified in the key; and inserting into the row of the source universal data structure, the associated source column data;

accessing a target data store identified in the one or more test properties;

retrieving a target data set from the target data store based upon the target query;

generate, from the target data set, a target universal data structure, comprising a target key value and associated target column data that is associated with the target key value, by:

generating and inserting into a row of the target universal data structure the target key value by merging data that is in a common row of the target data set and is in columns of the target data set specified in the key; and inserting into the row of the target universal data structure, the associated target column data;

performing a validation test of all of the target data set in accordance with the one or more test properties, by comparing the row of the source universal data structure with the row of the target universal data structure to identify key mismatches, data mismatches associate with the key, or both; and transmitting an electronic indication of results of the validation test to a reporting electronic device.

15. The computer-implemented method of claim 14, wherein the one or more test properties comprises an indication to compare the target data set with business validation rules to determine a data quality of the target data set; and wherein the business validation rules comprise an invocation of function by setting one or more parameters in the one or more test properties configuration files, the function comprising:

a range validation pertaining to values in the target data set and a specified range;

a value contains validation pertaining to the values in the target data set containing or not containing a particular specified content;

a duplication validation pertaining to whether the target data set has duplicate content; or any combination thereof.

16. The computer-implemented method of claim 14, wherein the one or more test properties comprises an indication to compare the target data set with the source data set to determine a data nexus between the source data set and the target data set; and wherein the method comprises:

based upon the indication to compare the target data set with the source data set:

accessing the source data store identified in the one or more test properties;

retrieving the source data set from the source data store; and performing the compare of all records of the target data set with all records of the source data set, in accordance with the one or more test properties.

17. The computer-implemented method of claim 14, comprising:

storing the source data set in a source universal data structure;

storing the target data set in a target universal data structure; and performing the comparing using the source universal data structure and the target universal data structure.

18. A computer-implemented system, comprising:

a configuration parser, comprising a first at least one hardware-based processor configured to:

receive one or more test properties configuration files; and extract one or more test properties from the one or more test properties configuration files, by parsing the one or more test properties configuration files, wherein the one or more test properties comprise: a source query, a target query, a key, and values;

a source data access object (DAO) configured to:

access a source data store identified in the one or more test properties;

retrieve a source data set from the source data store based on the source query; and generate, from the source data set, a source universal data structure, comprising a source key value and associated source column data that is associated with the source key value, by:
  generating and inserting into a row of the source universal data structure the source key value by merging data that is in a common row of the source data set and is in columns of the source data set specified in the key; and
  inserting into the row of the source universal data structure, the associated source column data;
a target data access object (DAO) configured to:
  access a target data store identified in the one or more test properties;
  retrieve a target data set from the target data store based upon the target query; and
  generate, from the target data set, a target universal data structure, comprising a target key value and associated target column data that is associated with the target key value, by:
    generating and inserting into a row of the target universal data structure the target key value by merging data that is in a common row of the target data set and is in columns of the target data set specified in the key; and
    inserting into the row of the target universal data structure, the associated target column data;
a validation engine, comprising a second at least one processor that is the same or different than the first at least one processor, where the second at least one processor is configured to:
  perform a validation test of all of the target data set in accordance with the one or more test properties, by comparing the row of the source universal data structure with the row of the target universal data structure to identify key mismatches, data mismatches associate with the key, or both; and
a report utility, comprising a third at least one processor that is the same or different than the first at least one processors and the second at least one processor, wherein the third at least one processor is configured to:
  transmit an electronic indication of results of the validation test to a reporting electronic device.

19. The computer-implemented system of claim 18,
wherein the validation engine comprises a comparator, configured to:
  perform a comparison of all records of the target data set with all records of the source data set, in accordance with the one or more test properties.

20. The computer-implemented system of claim 19, wherein:
  the source DAO is configured to store the source data set in the source universal data structure;
  the target DAO is configured to store the target data set in the target universal data structure; and
  the comparator is configured to use the source universal data structure and the target universal data structure for the comparison.

* * * * *